United States Patent
You et al.

(10) Patent No.: US 10,833,304 B2
(45) Date of Patent: Nov. 10, 2020

(54) ONE-WAY VALVE, TOP COVER COMPONENT, BOX AND BATTERY MODULE

(71) Applicant: Contemporary Amperex Technology Co., Limited, Ningde (CN)

(72) Inventors: Zhiyi You, Ningde (CN); Xiaofan Wang, Ningde (CN); Feng Qin, Ningde (CN); Lin Ma, Ningde (CN); Zhi Wang, Ningde (CN); Xinfu Xiao, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 142 days.

(21) Appl. No.: 16/115,142

(22) Filed: Aug. 28, 2018

(65) Prior Publication Data

US 2019/0245174 A1 Aug. 8, 2019

(30) Foreign Application Priority Data

Feb. 8, 2018 (CN) .......................... 2018 1 0128660

(51) Int. Cl.
*H01M 2/12* (2006.01)
*H01M 2/10* (2006.01)
*H01M 2/04* (2006.01)

(52) U.S. Cl.
CPC ....... *H01M 2/1229* (2013.01); *H01M 2/1016* (2013.01); *H01M 2/1247* (2013.01);
(Continued)

(58) Field of Classification Search
CPC .. H01M 2200/20; H01M 2/04; H01M 2/1016; H01M 2/1229; H01M 2/1247; H01M 2/1264; H01M 2/1288
See application file for complete search history.

(56) References Cited

U.S. PATENT DOCUMENTS 4,546,053 A * 10/1985 Sundberg ............ H01M 10/342
429/129
2005/0005979 A1 1/2005 Stocchiero
(Continued)

FOREIGN PATENT DOCUMENTS

CN 2898508 Y 5/2007
CN 102362110 A 2/2012
(Continued)

OTHER PUBLICATIONS

Machine translation CN202585585(U) (Year: 2012).*
(Continued)

*Primary Examiner* — Victoria H Lynch
(74) *Attorney, Agent, or Firm* — Law Offices of Liaoteng Wang

(57) ABSTRACT

The disclosure relates to a one-way valve, a top cover component, a box and a battery module. The one-way valve includes: a valve body including an inlet end, an exhaust end and an air-flow passage, the air-flow passage including a first flow-passing hole, a second flow-passing hole and a protrusion disposed on a bottom wall of the first flow-passing hole, the second flow-passing hole penetrating through the protrusion; an elastic valve cap, the protrusion being sheathed with and in a sealed connection with the elastic valve cap, a flow-passing gap is formed between an outer surface of the elastic valve cap and a hole wall of the first flow-passing hole, the second flow-passing hole includes a conical hole-section; a valve cover in connection with the exhaust end, wherein the valve cover is disposed within the first flow-passing hole and includes an exhaust passage in connection with the first flow-passing hole.

9 Claims, 8 Drawing Sheets

(52) U.S. Cl.
CPC ............ *H01M 2/1288* (2013.01); *H01M 2/04* (2013.01); *H01M 2/1264* (2013.01); *H01M 2200/20* (2013.01)

(56) References Cited

U.S. PATENT DOCUMENTS

| | | | |
|---|---|---|---|
| 2012/0315514 | A1 | 12/2012 | Guo |
| 2016/0126517 | A1 | 5/2016 | Koch et al. |

FOREIGN PATENT DOCUMENTS

| | | | |
|---|---|---|---|
| CN | 202585585 U | | 12/2012 |
| CN | 105359297 A | | 2/2016 |
| CN | 206076342 U | | 4/2017 |
| JP | S53-116633 U | | 9/1978 |
| JP | S60-174060 U | | 11/1985 |
| JP | H03-032360 U | | 3/1991 |
| JP | 2001-297743 A | | 10/2001 |
| JP | 2003-045396 A | | 2/2003 |
| JP | 2007-122925 A | | 5/2007 |
| JP | 2012-104471 A | | 5/2012 |
| JP | 2012-109130 A | | 6/2012 |
| JP | 2014-209526 A | | 11/2014 |
| JP | 2014-236180 A | | 12/2014 |

OTHER PUBLICATIONS

Machine translation JP60174060U (Year: 1985).*
The First Office Action for Japanese Application No. 2018-148577, dated Sep. 24, 2019, 4 pages.
Extended European Search Report for European Application No. 18192193.3, dated Nov. 9, 2018, 17 pages.
First Office Action and Search Report for Chinese Application No. 201810128660.6, dated Sep. 15, 2020, 8 pages.

* cited by examiner

ONE-WAY VALVE, TOP COVER COMPONENT, BOX AND BATTERY MODULE

CROSS-REFERENCE TO RELATED APPLICATIONS

This application is filed based on a Chinese patent application No. 201810128660.6 filed on Feb. 8, 2018 and claims the priority of the Chinese patent application, the entire contents of which are incorporated herein by reference.

FIELD OF THE INVENTION

The disclosure relates to a field of secondary battery, and particularly, to a one-way valve, a top cover component, a box and a battery module.

BACKGROUND

With technical development, power batteries are applied to more and more areas involving production and life. The power battery, also known as secondary battery, is a rechargeable battery. The power batteries with a low capacity may be applied to small electric vehicles, and the power batteries with a high capacity may be applied to large electric vehicles, such as hybrid electric vehicles or electric cars. When the power batteries were used in groups, a plurality of power batteries were encapsulated to form a battery module.

Chemical reactions within the power battery may produce gas. If the internal pressure of the power battery increases to a rated pressure, it may cause explosion and combustion of the power battery. Or, when the battery module is in use, there will be gas accumulated within the battery module. When gas accumulated within the battery module is too much and the internal pressure of the battery module exceeds a design pressure, it may lead to deformations of the battery module.

In prior art, a one-way valve is used to release the internal pressure of the power battery or the battery module. However, a contact area of a rubber cap and a metal valve body is large in existing one-way valves, and the larger the contact area of the rubber cap and the metal valve body is, the greater Van der Waals force produced between contact surfaces of the rubber cap and the metal valve body, leading to an opening pressure of the one-way valve larger than a design opening pressure. This is disadvantageous to discharge of the gas in the power battery or the battery module, affecting safety of the battery module when it is in use.

SUMMARY OF THE INVENTION

Embodiments of the disclosure provide a one-way valve, a top cover component, a box and a battery module. The one-way valve is applied to the battery module, which ensures smooth release of the internal pressure of the battery module and avoids deformations of the battery module due to excessive pressure.

In an aspect, an embodiment of the disclosure provides a one-way valve for use in a battery module, the one way valve comprising: a valve body comprising an inlet end and an exhaust end opposite to each other in an axial direction of the valve body and an air-flow passage penetrating through the inlet end and the exhaust end, wherein the valve body is a columnar structure, the air-flow passage comprises a first flow-passing hole and a second flow-passing hole distributed from the exhaust end to the inlet end, and the valve body further comprises a protrusion disposed on a bottom wall of the first flow-passing hole and extending towards the exhaust end, the second flow-passing hole penetrating through the protrusion; an elastic valve cap comprising an receiving concavity, wherein the protrusion is sheathed with the elastic valve cap via the receiving concavity and is in a sealed connection with the elastic valve cap, a flow-passing gap is formed between an outer surface of the elastic valve cap and a hole wall of the first flow-passing hole, a top end surface of the protrusion is in contact with a bottom wall of the receiving concavity, and the second flow-passing hole comprises a conical hole-section disposed on the top end surface, the conical hole-section diminishing gradually from the top end surface towards the inlet end; a valve cover in connection with the exhaust end, wherein the valve cover is disposed within the first flow-passing hole and is pressed against the elastic valve cap and comprises an exhaust passage in connection with the first flow-passing hole.

According to an aspect of embodiments of the disclosure, the cone angle of the conical hole-section is larger than 0° and less than 180°.

According to an aspect of embodiments of the disclosure, the one-way valve further comprises a mounting flange disposed on an outer peripheral surface of the exhaust end.

According to an aspect of embodiments of the disclosure, an outer end surface of the valve cover is leveled with an end surface of the exhaust end and the exhaust passage is an exhaust hole or an exhaust slot.

According to an aspect of embodiments of the disclosure, the valve body comprises a first positioning portion disposed on the first flow-passing hole and an end surface facing towards the elastic valve cap of the valve cover is in contact with the first positioning portion.

According to an aspect of embodiments of the disclosure, the one-way valve further comprises a filter component disposed within the second flow-passing hole and in an interference fit with the second flow-passing hole.

According to an aspect of embodiments of the disclosure, the valve body comprises a second positioning portion disposed on the second flow-passing hole, the filter component facing towards an end surface of the exhaust end and in contact with the second positioning portion.

The one-way valve provided by embodiments of the disclosure may be applied to a battery module. The battery module comprises a box and a plurality of batteries disposed within the box. The one-way valve may be mounted on the box and/or the batteries. As a contact area of the elastic valve cap and the top end surface of the protrusion is small in the one-way valve, the one-way valve will be easily opened when the internal pressure of the box or the battery included in the battery module is increased to a predetermined pressure, so that gas within the box or the battery may be discharged through the one-way valve. Therefore, the internal pressure of the box or the battery is constant, which may avoid deformations of the box or the battery due to excessive pressure inside the box or the single battery.

In another aspect, an embodiment of the disclosure provides a top cover component for use in a single battery, the top cover component comprising: a top cover plate and an electrode terminal disposed on the top cover plate, wherein the top cover plate comprises a top end and a bottom end opposite to each other in a thickness direction of the top cover plate, the one-way valve is disposed on the top cover plate, the one-way valve and the electrode terminal are disposed apart in a length direction of the top cover plate, the exhaust end of the one-way valve is in connection with the top end, and the inlet end of the one-way valve is located near the bottom end.

In yet another aspect, an embodiment of the disclosure provides a box for use in the battery module, the box comprising: a baseplate and side plates in connection with the baseplate, wherein the baseplate and the side plates form a receiving part for receiving a single battery; the one-way valve, wherein the one-way valve is in connection with the baseplate or the side plates via the exhaust end and the inlet end is located within the receiving part.

In yet another aspect, an embodiment of the disclosure provides a battery module comprising: a box and a plurality of batteries disposed within the box, each of the plurality of batteries comprising a top cover plate, wherein the one-way valve is disposed on the box and/or the top cover plate.

DESCRIPTION OF THE DRAWINGS

Characteristics, advantages and technical effects of exemplary embodiments of the disclosure will be described below with reference to the accompany drawings.

The accompany drawings are not necessarily drawn according to actual scales.

| 1: valve body | 1a: inlet end; |
|---|---|
| 1b: exhaust end | 11: first flow-passing hole |
| 111: first hole-section | 112: second hole-section |
| 12: second flow-passing hole | 121: conical hole-section |
| 122: third hole-section | 123: fourth hole-section |
| 13: protrusion | 14: first positioning portion |
| 15: second positioning portion | 2: elastic valve cap |
| 21: receiving concavity | 3: valve cover |
| 31: exhaust passage | 4: mounting flange |
| 5: filter component | |

DETAILED DESCRIPTION

The implementation of the invention is further described in detail in combination with the accompanying drawings and embodiments. The detailed description of the following embodiments and the accompanying drawings are intended to exemplarily illustrate principles of the invention, and cannot be used to limit scopes of the invention, that is, the invention is not limited to the described embodiments.

In the description, it should be noted that, unless otherwise indicated, the meaning of "multiple" is two or more; the terms "up", "down", "left", "right", "inside", "outside" and other directives are used to facilitate and simplify the description of the invention, and they do not indicate or suggest that a specified device or element must have a specific orientation and thus cannot be interpreted as limiting the invention. In addition, the terms "first" and "second" and so on are used only for descriptive purpose, and should not be interpreted as indicating or suggesting relative importance.

In the description, it should also be noted that, unless otherwise specified and defined, the terms "install", "connection", "connect" should be generally interpreted as, for example, a fixed connection, a detachable connection, or an integrated connection; it can be a direct connection or an indirect connection by means of an intermediate media. Those ordinary skilled in the art may interpret specific meaning of the above terms in the invention according to specific circumstances.

In order to better understand the disclosure, a one-way valve of embodiments of the disclosure is described in detail in combination with FIGS. 1 to 8.

Figure 1:
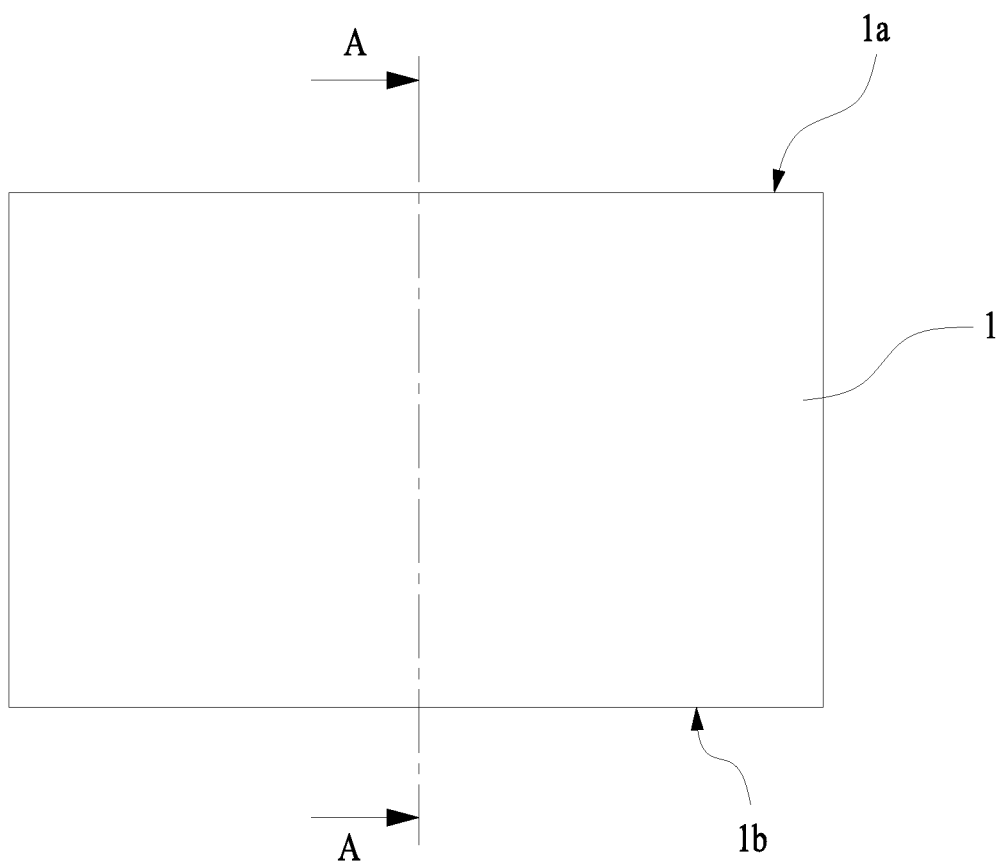
FIG. 1 is a diagram of a front view structure of a one-way valve of an embodiment of the disclosure.
Figure 2:
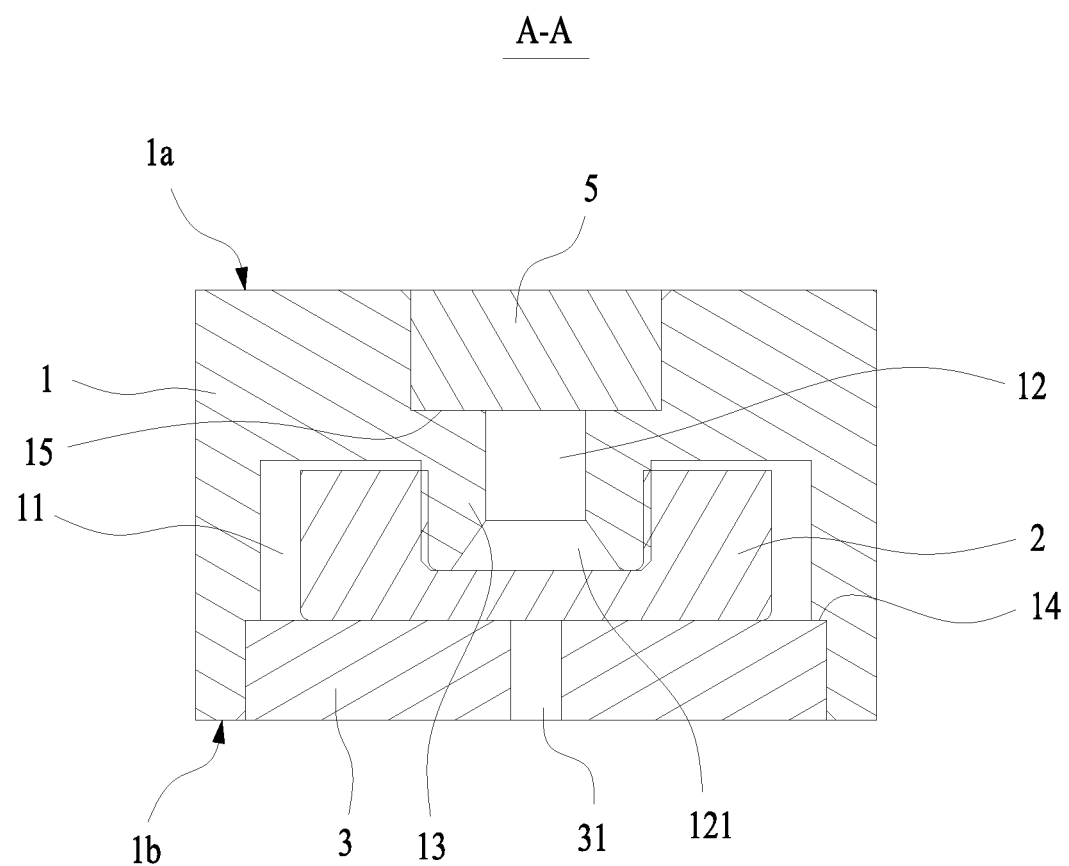
FIG. 2 is a diagram of A-A profile in FIG. 1.
Figure 3:
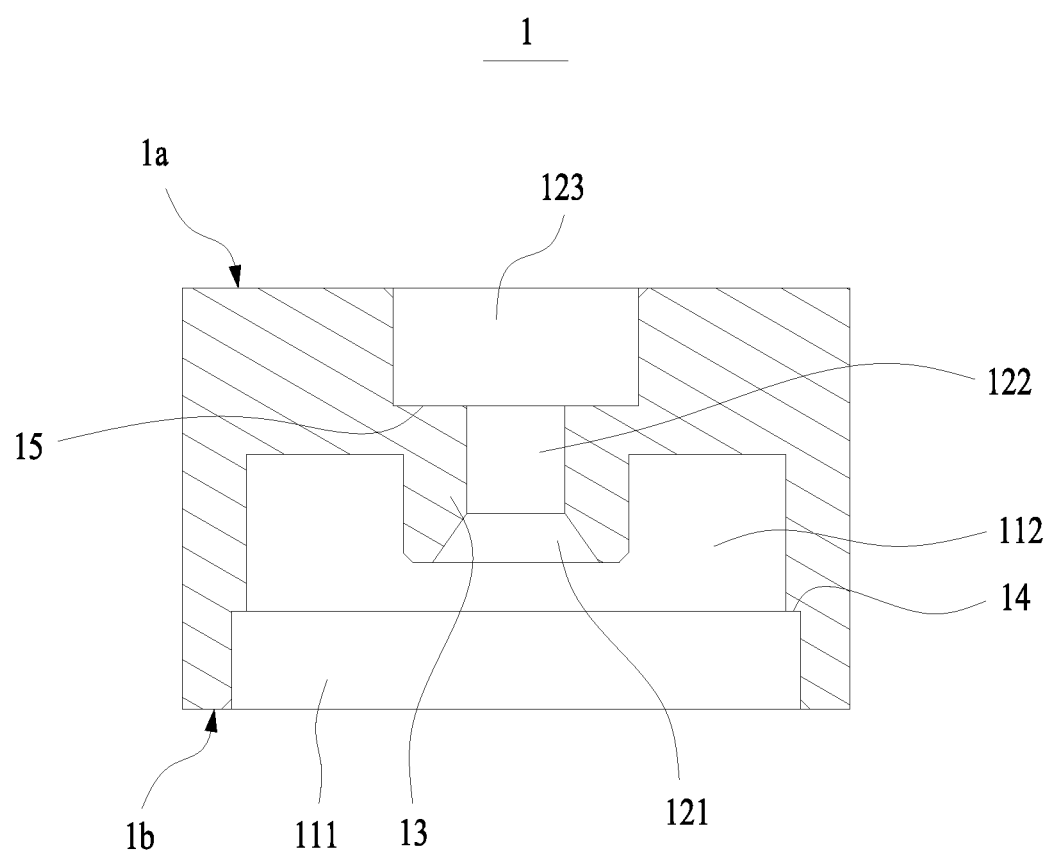
FIG. 3 is a diagram of a valve body of an embodiment of the disclosure.
Figure 4:
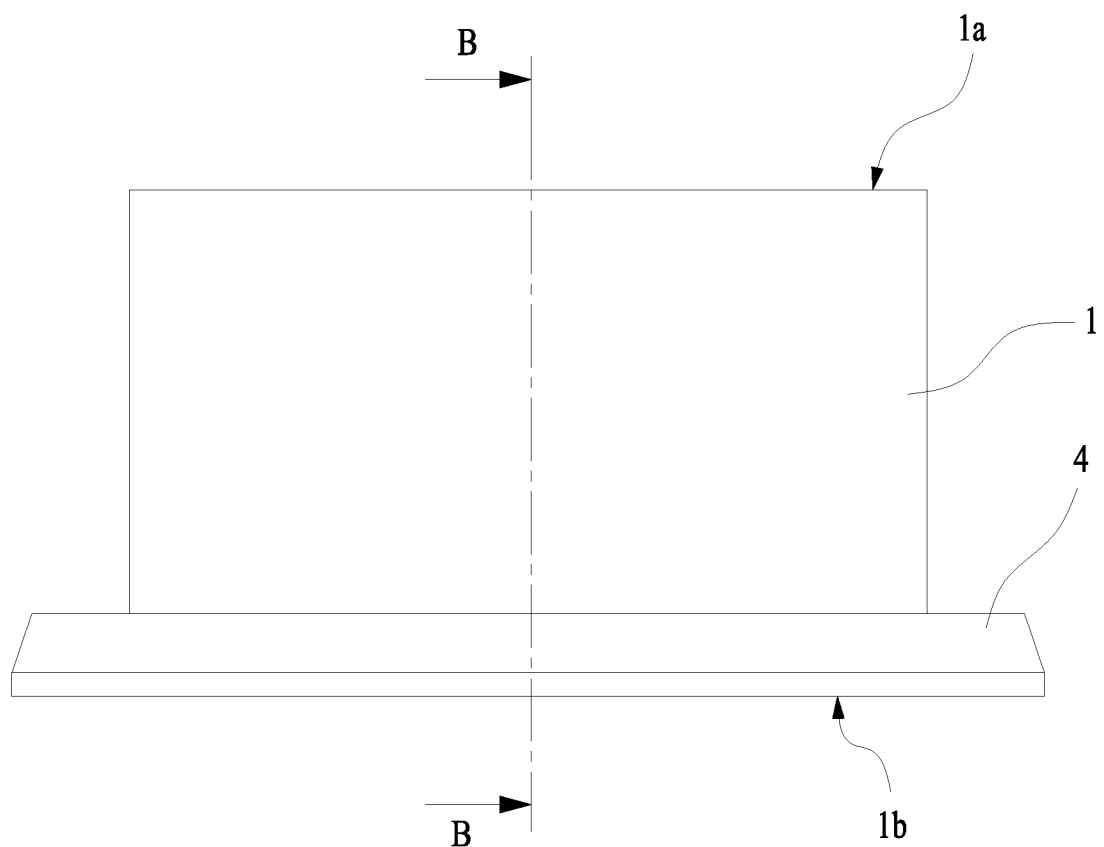
FIG. 4 is a diagram of a front view structure of a one-way valve of another embodiment of the disclosure.
Figure 5:
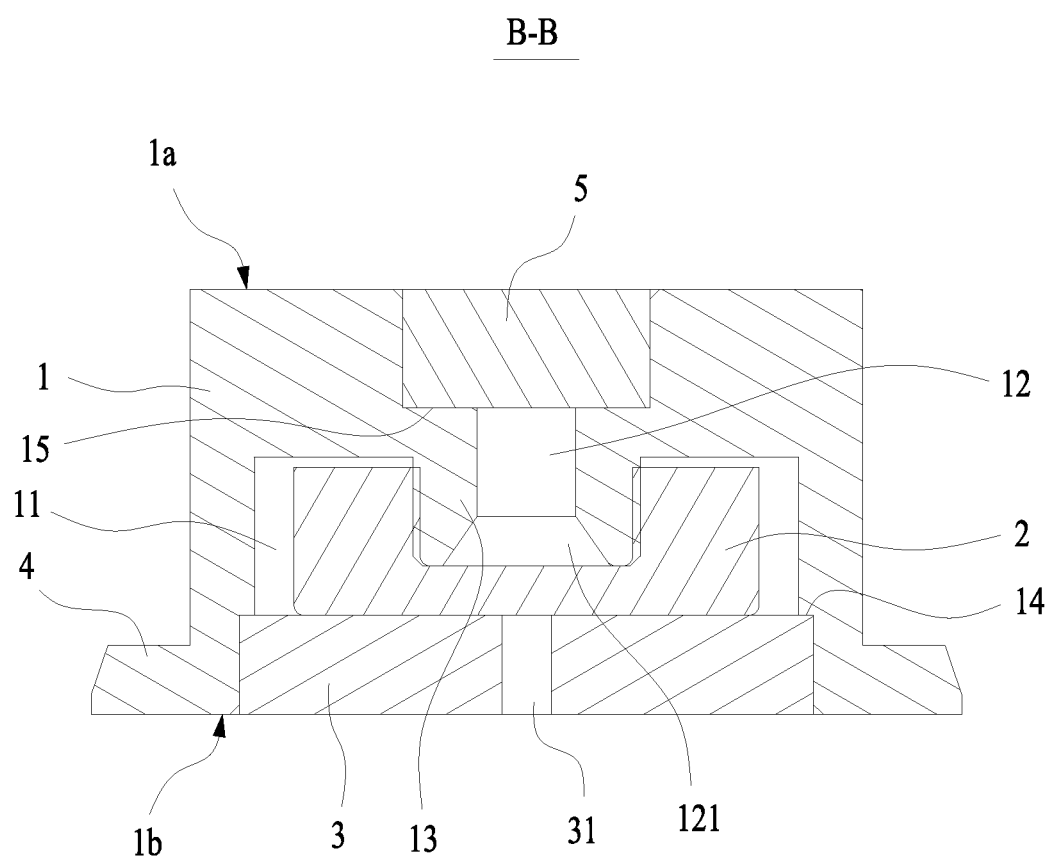
FIG. 5 is a diagram of B-B profile in FIG. 4.
Figure 6:
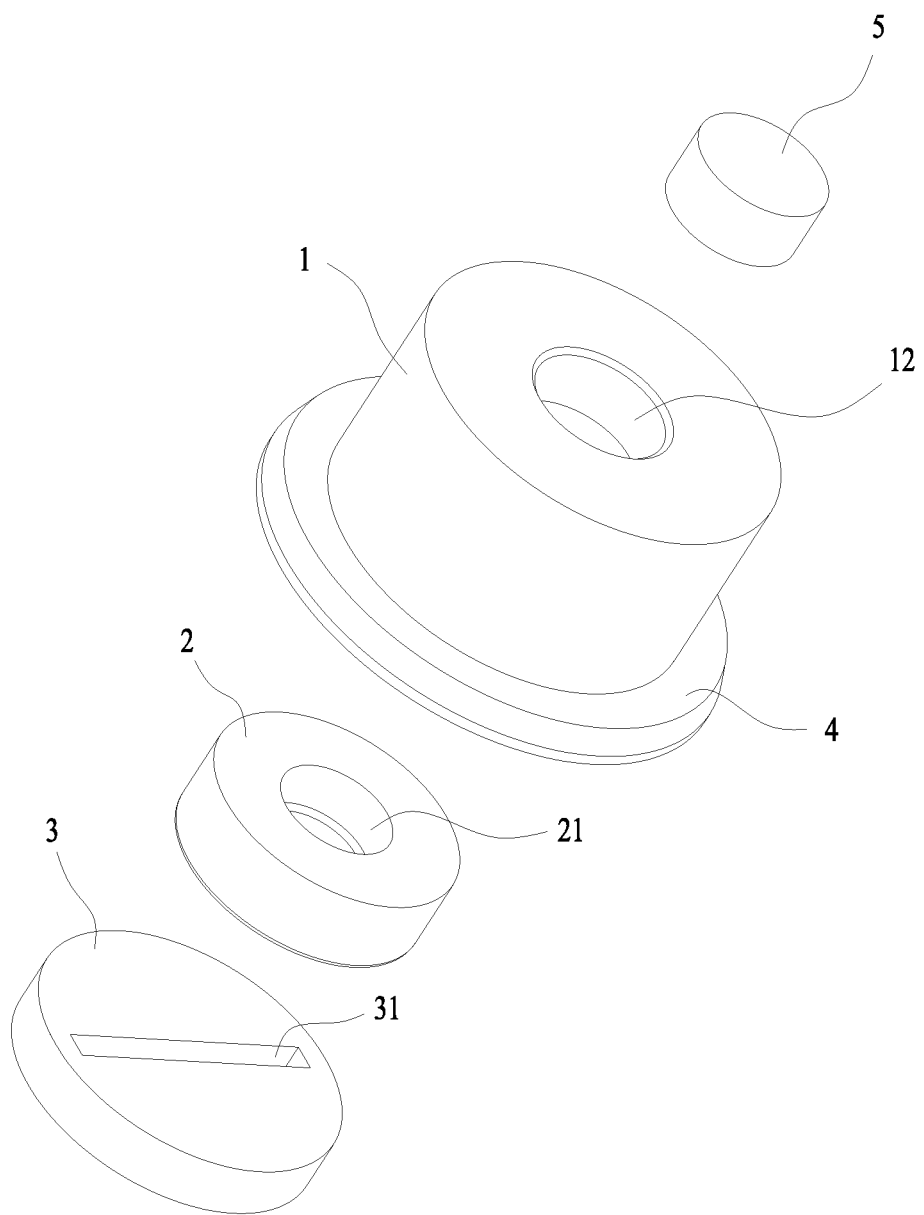
FIG. 6 is a diagram of a decomposed structure of a one-way valve of an embodiment of the disclosure.
Figure 7:
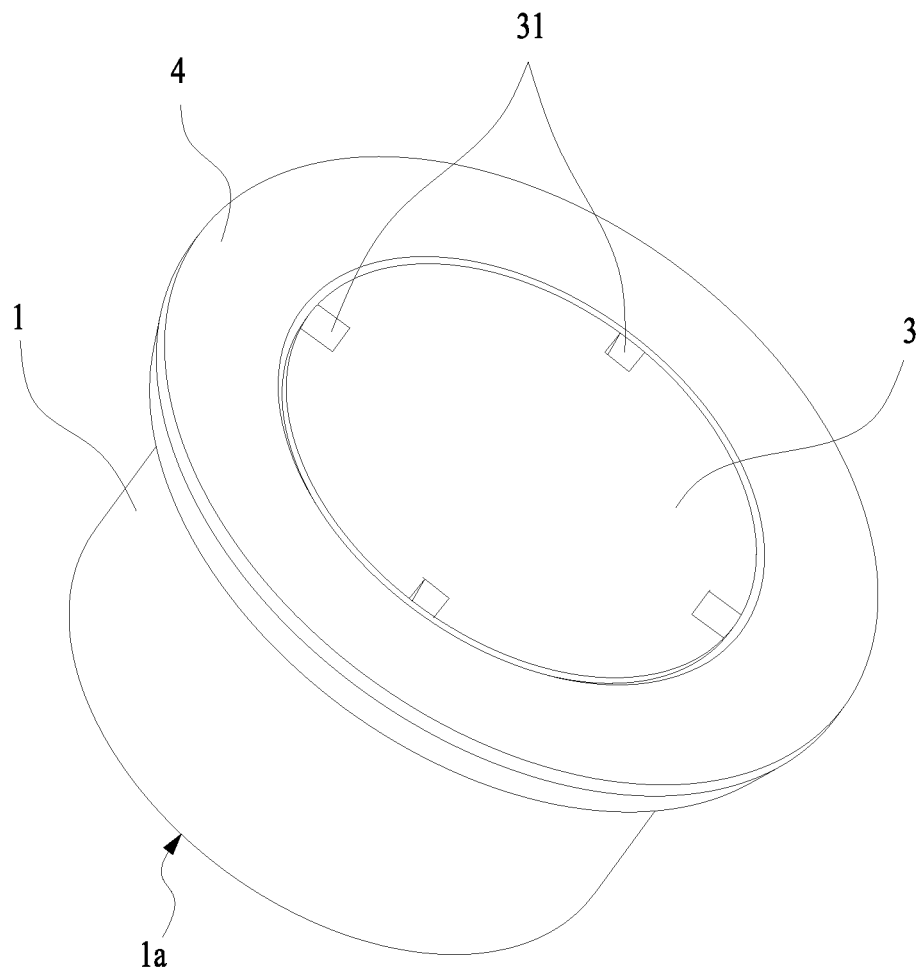
FIG. 7 is a diagram of an axial structure of a one-way valve of an embodiment of the disclosure.
Figure 8:
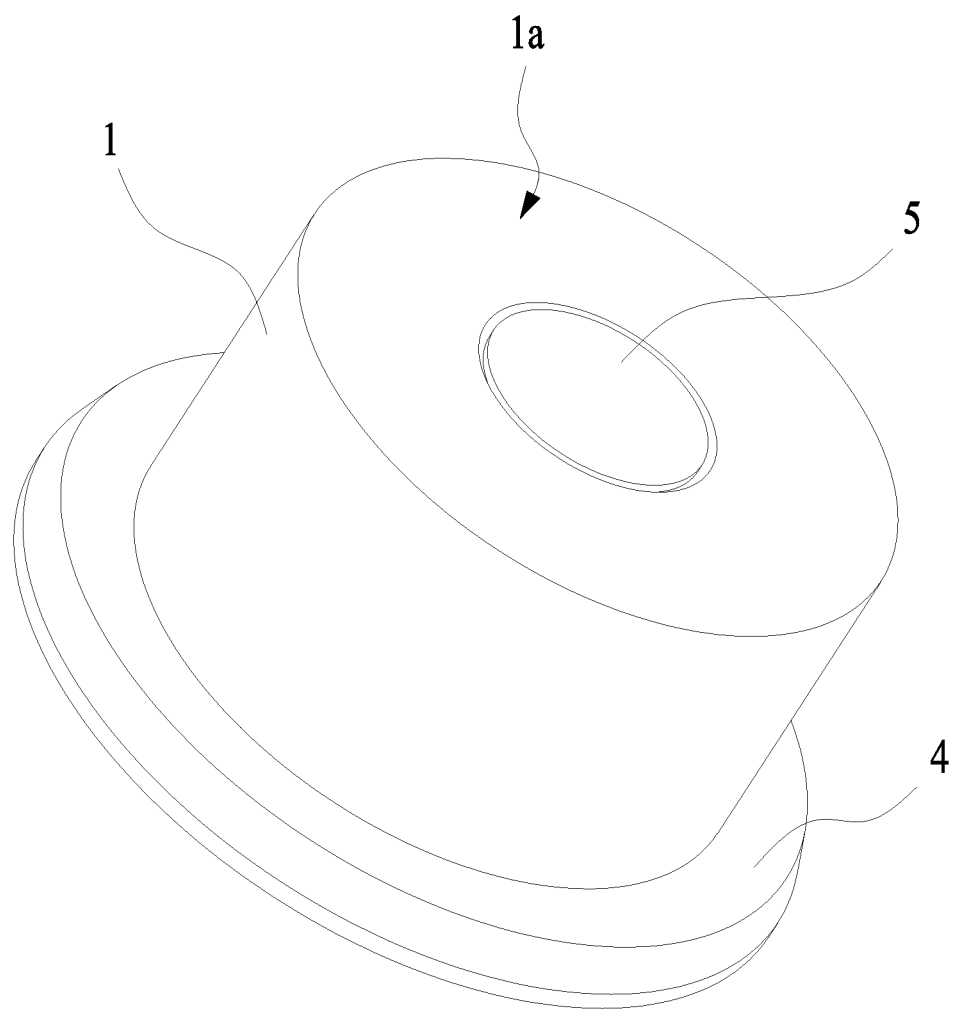
FIG. 8 is a diagram of an axial structure of a one-way valve of another embodiment of the disclosure.

FIG. 1 schematically illustrates a front view structure of a one-way valve of an embodiment of the disclosure. FIG. 2 is a structure of A-A profile in FIG. 1. FIG. 3 schematically illustrates a structure of a valve body 1 of an embodiment of the disclosure. FIG. 4 schematically illustrates a front view structure of a one-way valve of another embodiment of the disclosure. FIG. 5 is a structure of B-B profile in FIG. 4. FIG. 6 schematically illustrates a decomposed structure of a one-way valve of an embodiment of the disclosure. FIG. 7 schematically illustrates an axial structure of a one-way valve of an embodiment of the disclosure. FIG. 8 schematically illustrates an axial structure of a one-way valve of another embodiment of the disclosure.

The one-way valve of embodiments of the disclosure may be applied to a battery module. The battery module may release its internal pressure through the one-way valve and thus ensure its own safety when it is in use. The battery module of the embodiment includes a box and batteries disposed in the box. The one-way valve of the embodiment may be mounted on the box and may be used to release the internal pressure of the box; alternatively, the one-way valve of the embodiment may be mounted on a top cover plate of the battery to release the internal pressure of the battery.

As shown in FIGS. 1 to 3, the one-way valve of the embodiment includes a valve body 1, an elastic valve cap 2 and a valve cover 3. The valve body 1 of the embodiment is a columnar structure. The valve body 1 includes an inlet end 1a and an exhaust end 1b opposite to each other in an axial direction of the valve body and an airflow passage penetrating through the inlet end 1a and the exhaust end 1b. When the one-way valve of the embodiment is applied to a product, the one-way valve is connected to an external structure via the exhaust end 1b, the inlet end 1a of the one-way valve is located in a high pressure area and the exhaust end 1b is located in a low pressure area. When the pressure in the high pressure area exceeds an opening pressure of the one-way valve, gas may be discharged from the high pressure area to the low pressure area through the airflow passage of the one-way valve to release pressure.

When the one-way valve of the embodiment is applied to the box or a single battery included in the battery module, the exhaust end 1b of the one-way valve is connected with the top cover plate of the battery or the box, and the inlet end 1a of the one-way valve is located within the box or the battery and is in a free state. In this way, when the internal pressure of the box or the battery is high, the internal pressure may be released through the one-way valve to avoid deformations of the box or the battery due to excessive pressure inside the box or the battery. The one-way valve is protected by the box or the top cover plate, so it is not easily to be deformed or damaged by external forces. In addition, the one-way valve will not occupy the outer space of the box or the top cover plate, and will not cause any position interference to components adjacent to the box or the top cover plate.

The airflow passage of the embodiment includes a first flow-passing hole 11 and a second flow-passing hole 12 distributed from the exhaust end 1b to the inlet end 1a. A step surface is formed between the first flow-passing hole 11 and the second flow-passing hole 12 and the step surface is a bottom wall of the first flow-passing hole 11. The valve body 1 further includes a protrusion 13 disposed on the bottom wall of the first flow-passing hole 11. The protrusion 13 extends towards the exhaust end 1b. The second flow-passing hole 12 penetrates through the protrusion 13 and is connected with the first flow-passing hole 11.

The protrusion 13 is sheathed with the elastic valve cap 2 and is in a sealed connection with the elastic valve cap 2. Both an outer peripheral surface and an end surface facing towards the bottom wall of the first flow-passing hole 11 of the elastic valve cap 2 form a flow-passing gap with a hole wall of the first flow-passing hole 11. The valve cover 3 is connected with the exhaust end 1b. At least part of the valve cover 3 is disposed within the first flow-passing hole 11 and is pressed against the elastic valve cap 2 to ensure that the position of the elastic valve cap 2 is stable and thus to avoid the elastic valve cap 2 falling off the protrusion 2 due to an instantaneous impact by an airflow on the elastic valve cap 2. The valve cover 3 includes an exhaust passage 31 in connection with the first flow-passing hole 11. Alternatively, the elastic valve cap 2 is made of rubber material or silica gel material. The valve body 1 and the valve cover 3 are made of aluminum or steel.

When the pressure at the inlet end 1a is larger than the opening pressure of the one-way valve, the gas enters the second flow-passing hole 12, applies pressure to the elastic valve cap 2 to push the elastic valve cap 2 away from the outer peripheral surface of the protrusion 13, enters the first flow-passing hole 11, and finally exits from the one-way valve via the exhaust passage 31 on the valve cover 3 that is disposed at the exhaust end 1b.

The elastic valve cap 2 of the embodiment has a receiving concavity 21 for interference fit with the protrusion 13 (as shown in FIG. 6). In a natural state, the maximum inner diameter of the receiving concavity 21 is less than the maximum outer diameter of the protrusion 13. After the protrusion 13 is sheathed with the elastic valve cap 2, the inner wall of the receiving concavity 21 may be closely fitted with the outer surface of the protrusion 13, so both of them may be in a sealed connection with each other. In one example, the protrusion 13 is a cylindrical structure and the receiving concavity 21 is a circular blind hole.

In the embodiment, as shown in FIG. 2 or FIG. 5, the bottom wall of the receiving concavity 21 is closely fitted with the top end surface facing towards the exhaust end 1b of the protrusion 13. The second flow-passing hole 12 includes a conical hole-section 121 disposed on the top end surface of the protrusion 13. The conical hole-section 121 shrinks from the top end surface of the protrusion 13 towards the inlet end 1a. In this way, on the one hand, the contact area of the top end surface of the protrusion 13 having the conical hole-section 121 and the bottom wall of the receiving concavity 21 of the elastic valve cap 2 is small, and Van der Waals force produced between contact surfaces of the elastic valve cap 2 and the protrusion 13 is reduced. As the one-way valve has a more accurate opening pressure, the response speed of the one-way valve is faster and the response precision of the one-way valve is higher, so when the internal pressure of the battery or the battery module reaches the opening pressure of the one-way valve, the one-way valve will automatically discharge gas and thus release the internal pressure of the battery or the battery module, reducing the probability of the one-way valve not opened when the internal pressure of the battery or the battery module reaches the opening pressure of the one-way valve.

In one embodiment, the opening pressure of the one-way valve is adjusted by adjusting the pressure applied on the top end surface of the protrusion 13 by the bottom wall of the receiving concavity 21 of the elastic valve cap 2. By adjusting the pressure applied on the elastic valve cap 2 by the valve cover 3, the pressure applied on the top end surface of the protrusion 13 by the bottom wall of the receiving concavity 21 of the elastic valve cap 2 is adjusted.

In one embodiment, on the premise that the pressure applied on the elastic valve cap 2 by the valve cover 3 is unchanged, the opening pressure of the one-way valve is changed by adjusting the contact area between the bottom wall of the receiving concavity 21 of the elastic valve cap 2 and the top end surface of the protrusion 13. In one example, the cone angle of the conical hole-section 121 is larger than 0 degrees and less than 180 degrees, so the contact area of the bottom wall of the receiving concavity 21 of the elastic valve cap 2 and the top end surface of the protrusion 13 may be adjusted and thus the opening pressure of the one-way valve may be adjusted. If the contact area between the bottom wall of the receiving concavity 21 of the elastic valve cap 2 and the top end surface of the protrusion 13 is large, then the opening pressure of the one-way valve is large; if the contact area between the bottom wall of the receiving concavity 21 of the elastic valve cap 2 and the top end surface of the protrusion 13 is small, then the opening pressure of the one-way valve is small. The one-way valve of the embodiment can flexibly adjust its own opening pressure according to actual product requirements. As the one-way valve of the embodiment may adjust its own opening pressure by adjusting the size of its own cone angle, the processing and manufacturing of the one-way valve is convenient and it is unnecessary to make large adjustments to the production line or processing procedure of the one-way valve, so the manufacturing cost of the one-way valve is low. When the one-way valve is in an open state, the elastic valve cap 2 is limited by the valve cover 3 and no displacement of the elastic valve cap 2 occurs in the axial direction of the protrusion 13.

In one embodiment, the inner circumferential wall of the receiving concavity 21 of the elastic valve cap 2 is closely fitted with the outer peripheral surface of the protrusion 13. The pressure applied on the outer peripheral surface of the protrusion 13 by the elastic valve cap 2 is adjusted by adjusting the aperture of the receiving concavity 21 of the elastic valve cap 2. The pressure applied on the outer peripheral surface of the protrusion 13 by the elastic valve cap 2 is less than the pressure applied on the top end surface of the protrusion 13 by the bottom wall of the receiving concavity 21 of the elastic valve cap 2, ensuring that when the pressure at the inlet end 1a is larger than the opening pressure of the one-way valve, the gas may enter the second flow-passing hole 12, apply pressure on the elastic valve cap 2 to push the elastic valve cap 2 and enter the first flow-passing hole 11, and finally exit from the exhaust end 1b. When the one-way valve is in the open state, the elastic valve cap 2 is limited by the valve cover 3 and no displacement of the elastic valve cap 2 occurs in the axial direction of the protrusion 13.

As shown in FIGS. 4 and 5, the one-way valve of the embodiment further includes a mounting flange 4 disposed on the outer peripheral surface of the exhaust end 1b. The mounting flange 4 is a ring structure. The mounting flange 4 is used for locating and fixing the one-way valve itself. In one example, the mounting flange 4 and the exhaust end 1B forms an integrated structure. When the one-way valve of the embodiment is applied to the battery module, a counterbore is disposed on the box or the top cover plate included in the battery module, the inlet end 1a of the one-way valve may pass through the counterbore, the mounting flange 4 may be inserted in the counterbore, and the mounting flange 4 may be connected with the box or the top cover plate by welding. The mounting flange 4 may play a positioning role for the one-way valve, so it is convenient to mount and fix the one-way valve and complete connecting works quickly.

The outer end surface back to the elastic valve cap 2 of the valve cover 3 is leveled with the end surface of the exhaust end 1b of the valve body 1, so the valve cover 3 is protected by the valve body 1 from being deformed or damaged by external force impacts.

As shown in FIG. 6, the exhaust passage 31 disposed on the valve cover 3 of the embodiment is an exhaust hole. The exhaust hole is connected with the first flow-passing hole 11. The number of exhaust holes may be one or more. Multiple exhaust holes are circularly distributed.

As shown in FIG. 7, the exhaust passage 31 disposed on the valve cover 3 of the embodiment is an exhaust slot disposed on the outer peripheral surface of the valve cover 3. The exhaust slot is connected to the first flow-passing hole 11. The number of exhaust slots may be one or more. Multiple exhaust slots are circularly distributed.

The valve cover 3 of the embodiment is in interference fit with the first flow-passing hole 11. The outer diameter of the valve cover 3 is larger than the inner diameter of the first flow-passing hole 11. After the protrusion 13 is sheathed with the elastic valve cap 2, an axial force is applied to the valve cover 3 to directly press the valve cover 3 into the first flow-passing hole 11. In this way, the valve cover 3 is connected with the valve body 1 without any additional connecting component, simplifying the connecting process and improving the assembly efficiency, and thus reducing the manufacturing difficulty of the valve cover 3 and the valve body 1.

In one embodiment, the valve body 1 further includes a first positioning portion 14 disposed on the first flow-passing hole 11. An axial force is applied to the valve cover 3 so that the valve cover 3 gradually enters the first flow-passing hole 11. When the inner end surface facing towards the elastic valve cap 2 of the valve cover 3 is in contact with the first positioning portion 14, the valve cover 3 reaches a predetermined position of the first flow-passing hole 11. At this point, it is time to stop pushing the valve cover 3 to avoid excessively pushing the valve cover 3, which is beneficial to ensure the accurate installation of the valve cover 3.

Alternatively, as shown in FIG. 3, the first flow-passing hole 11 includes a first hole-section 111 and a second hole-section 112 with different diameters distributed from the exhaust end 1b to the inlet end 1a. The inner diameter of the first hole-section 111 is larger than the inner diameter of the second hole-section 112. In the embodiment, the second flow-passing hole 12 is a straight hole and the inner diameter of the second hole-section 112 is larger than the inner diameter of the second flow-passing hole 12, so a step surface is formed between the first flow-passing hole 11 and the second flow-passing hole 12, the step surface being the bottom wall of second hole-section 112. The protrusion 13 is disposed on the bottom wall of the second hole-section 112. The step surface formed between the first hole-section 111 and the second hole-section 112 is the first positioning portion 14. The valve cover 3 is disposed at the first hole-section 111 and is in interference fit with the first hole-section 111.

Alternatively, in the embodiment, the first flow-passing hole 11 and the second flow-passing hole 12 are straight holes, and the inner diameter of the first flow-passing hole 11 is larger than the inner diameter of the second flow-passing hole 12, so a step surface is formed between the first flow-passing hole 11 and the second flow-passing hole 12, the step surface being the bottom wall of the first flow-passing hole 11. The first positioning portion 14 is a bulge disposed on the hole wall of the first flow-passing hole 11. After the valve cover 3 is pushed into a predetermined distance, it may be pressed against the bulge to complete assembly work.

As shown in FIG. 5 and FIG. 8, the one-way valve of the embodiment further includes a filter component 5, which is disposed within the second flow-passing hole 12 and is in interference fit with the second flow-passing hole 12. The outer diameter of the filter component 5 is larger than the inner diameter of the second flow-passing hole 12, so that the filter component 5 may be directly pressed into the second flow-passing hole 12 by applying an axial force to the filter component 5. In this way, the filter component 5 and the valve body 1 may be connected without any additional connecting component, simplifying the connection process, improving the assembly efficiency, and also reducing the difficulty of the processing and manufacturing of the filter component 5 and the valve body 1.

Alternatively, the filtering component 5 is a gas-liquid separator allowing gas to pass through and preventing liquid from passing through. On the one hand, when the one-way valve is applied to the battery module, the one-way valve may prevent external water vapor from entering the box or the battery included in the battery module. On the other hand, the one-way valve may prevent liquid (such as electrolyte) inside the battery or the box from flowing out of the box or the battery.

Alternatively, the filter component 5 is a particle filter screen or filter sheet to prevent particles in the box from entering the one-way valve, avoid failure of the one-way valve due to the particles blocking the airflow channel of the one-way valve, ensure normal operation of the one-way valve and safety of the battery or the battery module when it is in use.

In one embodiment, the valve body 1 further includes a second positioning portion 15 disposed on the second flow-passing hole 12. An axial force is applied to the filter component 5 to make the filter component 5 gradually enter the second flow-passing hole 12. When the filter component 5 is in contact with the second positioning portion 15, the filter component 5 reaches a predetermined position in the second flow-passing hole 12. At this point, it is time to stop pushing the filter component 5 to avoid excessively pushing the filter component 5, which is beneficial to ensure the accurate installation of the filter component 5.

Alternatively, as shown in FIG. 3, the second flow-passing hole 12 includes a third hole-section 122 and a fourth hole-section 123 having different diameters distributed from the exhaust end 1b to the inlet end 1a. The third hole-section 122 is connected with the first flow-passing hole 11. The inner diameter of the third hole-section 122 is less than the inner diameter of the fourth hole-section 123. In the embodiment, the first flow-passing hole 11 may be a straight hole and the inner diameter of the first flow-passing hole 11 is larger than the inner diameter of the third hole-section 122, so a step surface is formed between the first flow-passing hole 11 and the second flow-passing hole 12, the step surface being the bottom wall of the first flow-passing hole 11. The first flow-passing hole 11 may also include the first hole-section 111 and the second hole-section 112 with different diameters. The inner diameter of the first hole-section 111 is larger than the inner diameter of the second hole-section 112 and the inner diameter of the second hole-section 112 is larger than the inner diameter of the third hole-section 122, so a step surface is formed between the first flow-passing hole 11 and the second flow-passing hole 12, the step surface being the bottom wall of the second hole-section 112. The step surface formed between the third hole-section 122 and the fourth hole-section 123 is the second positioning portion 15. The filter component 5 is disposed at the fourth hole-section 123 and is in interference fit with the fourth hole-section 123.

Alternatively, the second flow-passing hole 12 further includes a conical hole-section 121. The conical hole-section 121 is disposed between the third hole-section 122 and the first flow-passing hole 11, and the three nodes are mutually connected.

Alternatively, in the embodiment, the first flow-passing hole 11 and the second flow-passing hole 12 are straight holes and the inner diameter of the first flow-passing hole 11 is larger than the inner diameter of the second flow-passing hole 12, so a step surface is formed between the first flow-passing hole 11 and the second flow-passing hole 12, the step surface being the bottom wall of the first flow-passing hole 11. The second positioning portion 15 is a bulge disposed on the hole wall of the second flow-passing hole 12. After the filter component 5 is pushed into a predetermined distance, it may be pressed against the bulge and the assembly work is completed.

The one-way valve of the embodiment of the invention may be applied to the battery module. The battery module includes the box and the batteries disposed in the box. The one-way valve may be mounted on the box or the battery. When the internal pressure of the box or the battery included in the battery module is increased to the opening pressure of the one-way valve, the one-way valve will be opened, the gas within the box or the battery is discharged through the one-way valve, and the internal pressure of the box or the battery is kept constant, avoiding deformations of the box or the battery due to excessive pressure inside the box or the battery.

A top cover component is also provided in the embodiment of the invention. The top cover component is applied to a single battery. The top cover component of the embodiment includes a top cover plate and an electrode terminal disposed on the top cover plate. The top cover plate has a predetermined length and width. The one-way valve of the embodiment is disposed on the top cover plate. The one-way valve and the electrode terminal are disposed apart in the length direction of the top cover plate. The top cover plate is provided with a receiving hole extending from the top end to the bottom end of the top cover plate. The one-way valve is disposed within the receiving hole and the exhaust end 1$b$, which is included in the one-way valve, is connected with the top end of the top cover plate.

An electric core is disposed within in a shell with an opening, and the opening is sealed by the top cover component of the embodiment to form the battery. The electrode terminal included in the top cover component is electrically connected with the electric core. The inlet end 1$a$ of the one-way valve faces toward the electric core. In this way, when the internal pressure of the battery is high, the internal pressure may be released through the one-way valve, avoiding deformations of the battery due to excessive pressure inside the battery. The one-way valve as a whole is protected by the top cover plate, so it is not easily deformed or destroyed by external forces. In addition, the one-way valve will not occupy the outer space of the top cover plate, and will not cause any position interference to the components adjacent to the top cover plate.

An embodiment of the invention also provides the box. The box is applied to the battery module. The box is used to encapsulate multiple batteries so as to protect the batteries. The box of the embodiment includes a base plate, side plates connected with the bottom plate, and the one-way valve disposed on the bottom plate or the side plates. The bottom plate and the side plates form a receiving part for receiving the battery. There is an installation hole on the box, and the one-way valve is disposed within the installation hole. The exhaust end 1$b$ included in the one-way valve is connected with the bottom plate or the side plates of the box, and the inlet end 1$a$ is located in the receiving part of the box and is in a free state. In this way, when the internal pressure of the box is high, the internal pressure can be released through the one-way valve, avoiding deformations of the box due to excessive pressure. In addition, the one-way valve is protected by the box, and it is not easily deformed or destroyed by external forces.

The embodiment of the invention also provides a battery module, which includes the box and the plurality of batteries disposed within the box. Each battery includes a top cover plate. The battery module further includes the one-way valve of the embodiment disposed on the box and/or the top cover plate. The one-way valve is used to release the internal pressure of the battery module or the battery to ensure the constant state of the internal pressure of the battery module and improve the safety of the battery module when it is in use.

Although the present invention has been described with reference to preferred embodiments, a variety of improvements can be made without departing from the scope of the invention and the components of the invention can be replaced with the equivalent. In particular, as long as there is no structural conflict, all the technical features mentioned in the various embodiments can be combined in any way. The invention is not limited to specific embodiments disclosed in the text, but includes all technical options falling within the scope of claims.

What is claimed is:

1. A one-way valve for use in a battery module, comprising:

a valve body comprising an inlet end and an exhaust end opposite to each other in an axial direction of the valve body and an airflow passage penetrating through the inlet end and the exhaust end, wherein the valve body is a columnar structure, the airflow passage comprises a first flow-passing hole and a second flow-passing hole distributed from the exhaust end to the inlet end, and the valve body further comprises a protrusion disposed on a bottom wall of the first flow-passing hole and extending towards the exhaust end, the second flow-passing hole penetrating through the protrusion;

an elastic valve cap comprising a receiving concavity, the receiving concavity being a circular blind hole having a bottom wall and an inner sidewall extending substantially vertically from the bottom wall, wherein the inner sidewall of the receiving concavity is fitted with an outer surface of the protrusion so that the elastic valve cap is in a sealed connection with the protrusion, a flow-passing gap is formed between an outer sidewall of the elastic valve cap and a hole wall of the first flow-passing hole, a top end surface of the protrusion is in contact with the bottom wall of the receiving concavity, and the second flow-passing hole comprises a conical hole-section disposed on the top end surface, the conical hole-section diminishing gradually from the top end surface towards the inlet end;

a valve cover in connection with the exhaust end, wherein the valve cover is disposed within the first flow-passing hole and is pressed against the elastic valve cap and comprises an exhaust passage in connection with the first flow-passing hole, wherein the valve body comprises a first positioning portion disposed on the first flow-passing hole and an end surface facing towards the elastic valve cap of the valve cover is in contact with the first positioning portion.

2. The one-way valve of claim 1, wherein a cone angle of the conical hole-section is larger than 0° and less than 180°.

3. The one-way valve of claim 1, further comprising a mounting flange disposed on an outer peripheral surface of the exhaust end.

4. The one-way valve of claim 1, wherein an outer end surface of the valve cover is leveled with an end surface of the exhaust end and the exhaust passage is an exhaust hole or an exhaust slot.

5. The one-way valve of claim 1, further comprising a filter component disposed within the second flow-passing hole and in an interference fit with the second flow-passing hole.

6. The one-way valve of claim 5, wherein the valve body comprises a second positioning portion disposed on the second flow-passing hole, the filter component facing towards an end surface of the exhaust end and in contact with the second positioning portion.

7. A top cover component for use in a single battery, comprising:

a top cover plate and an electrode terminal disposed on the top cover plate, wherein the top cover plate comprises a top end and a bottom end opposite to each other in a thickness direction of the top cover plate, the one-way valve of claim 1 is disposed on the top cover plate, the one-way valve and the electrode terminal are disposed apart in a length direction of the top cover plate, the exhaust end of the one-way valve is in connection with the top end, and the inlet end of the one-way valve is located near the bottom end.

8. A box for use in a battery module, comprising:

a baseplate and side plates in connection with the baseplate, wherein the baseplate and the side plates form a receiving part for receiving a single battery;

the one-way valve of claim 1, wherein the one-way valve is in connection with the baseplate or the side plates via the exhaust end and the inlet end is located within the receiving part.

9. A battery module, comprising:

a box and a plurality of batteries disposed within the box, each of the plurality of batteries comprising a top cover plate, wherein the one-way valve of claim 1 is disposed on the box and/or the top cover plate.

* * * * *